(12) United States Patent
Ying et al.

(10) Patent No.: US 12,529,407 B2
(45) Date of Patent: Jan. 20, 2026

(54) LOCKABLE GAS SPRING

(71) Applicant: Yili Industrial U.S. Co., Ltd., Grand Rapids, MI (US)

(72) Inventors: Duanzhong Ying, Ningbo (CN); Libin Wang, Ningbo (CN)

(73) Assignee: Yili Industrial U.S. Co., Ltd., Grand Rapids, MI (US)

( * ) Notice: Subject to any disclaimer, the term of this patent is extended or adjusted under 35 U.S.C. 154(b) by 379 days.

(21) Appl. No.: 18/195,528

(22) Filed: May 10, 2023

(65) Prior Publication Data
US 2024/0240686 A1  Jul. 18, 2024

(30) Foreign Application Priority Data

Jan. 17, 2023  (CN) .......................... 202320113698.2

(51) Int. Cl.
*F16F 9/06* (2006.01)
*F16F 9/32* (2006.01)
*F16F 9/36* (2006.01)

(52) U.S. Cl.
CPC ............ *F16F 9/061* (2013.01); *F16F 9/3221* (2013.01); *F16F 9/369* (2013.01); *F16F 2222/12* (2013.01); *F16F 2230/30* (2013.01); *F16F 2232/08* (2013.01)

(58) Field of Classification Search
None
See application file for complete search history.

(56) References Cited

FOREIGN PATENT DOCUMENTS

| CN | 104235251 B | * | 4/2016 |
| CN | 207364165 U | * | 5/2018 |
| CN | 209130101 U | * | 7/2019 |

OTHER PUBLICATIONS

CN-104235251-B: English Machine Translation (Year: 2016).*
CN-207364165-U: English Machine Translation (Year: 2018).*
CN-209130101-U: English Machine Translation (Year: 2019).*

* cited by examiner

*Primary Examiner* — Melanie Torres Williams
(74) *Attorney, Agent, or Firm* — Gunther J. Evanina; BUTZEL LONG

(57) ABSTRACT

A gas spring includes an outer tube, an inner tube disposed within the outer tube and attached to a floating piston radially sealed between the outer tube and the inner tube and axially slidable within the outer tube, a chamber defined between the inner tube and the outer tube, a valve piston sealingly slidable within the inner tube, a piston rod fixed to the valve piston, a spacer fixed to the outer tube and axially disposed between a first end of the outer tube and the floating piston, and a spring compressible between the spacer and the floating piston.

8 Claims, 3 Drawing Sheets

LOCKABLE GAS SPRING

CROSS-REFERENCE TO RELATED APPLICATION

This application claims priority under 35 USC § 119(a) to Chinese Patent Application No. 2023201136982, filed on Jan. 17, 2023 which is incorporated herein by reference in its entirety.

FIELD OF THE DISCLOSURE

This disclosure relates to the technical field of gas springs, and specifically to a lockable spring.

BACKGROUND OF THE DISCLOSURE

A gas spring is an accessory that can perform the function of support, cushioning, braking, height adjustment, etc. It is generally used for pneumatic lift tables and furniture. However, the existing gas springs used in pneumatic lift tables have components that collide after the pneumatic lift table rises to the top, emitting a high decibel sound and requiring a high locking force value for preventing the table from falling.

SUMMARY OF THE DISCLOSURE

Disclosed is a gas spring, and in particular a low resistance lockable gas spring. A low resistance lockable gas spring, includes an outer tube and an inner tube, the inner tube is located inside the outer tube. One end of the outer tube is provided with a rear head. The other end of the outer tube is provided with a guide sleeve. A piston rod is slidingly connected inside the guide sleeve. A control rod is slidingly connected inside the piston rod. One end of the piston rod is located inside the inner tube. A valve needle is slidingly connected inside the slide. The end of the piston rod has a valve body piston slidingly sealed with the inner tube. A floating piston is slidingly sealed radially between the outer tube and the inner tube. The disclosed structure makes the floating piston suffer less friction when sliding, so that the floating piston is not easy to wear, thus improving the service life of the floating piston, and the sealing performance is better, reducing air or oil leakage phenomenon. The gas spring will collide with the spacer when the piston rod is extended to the longest, which will cause a high decibel sound.

The technical problem to be solved is to prevent a gas spring that will collide after the gas rises to the top from emitting a high decibel ringing. A lockable gas spring is proposed, which can effectively solve the technical problem.

To solve the above technical problems, the technical solution adopted by the utility model is a lockable gas spring including an outer steel tube; an inner steel tube, said inner steel tube is located within said outer steel tube; a piston rod, one end of said piston rod is located within said inner steel tube; and a spring is connected to said piston rod.

When the gas spring is extended to the top, the spring is compressed between the spacer and the valve body piston, thus giving a cushioning force to the valve body piston, slowing down the extension of the piston rod and avoiding a high decibel sound from the spacer and the valve body piston due to forceful collision.

Preferably, the top of said inner steel tube is bent outwardly at the end of said tube connected to said piston rod, and the top of said inner steel tube is riveted to the floating piston. The floating piston has an annular groove on the inside of the floating piston, the shape and size of which matches the shape and size of the outwardly curved top of the inner steel tube, through which the floating piston is riveted to the top of the inner steel tube using a riveting process, and the floating piston follows the movement of the inner steel tube.

Preferably, said inner steel tube is provided with an air chamber between said outer steel tube, said piston rod is connected to the valve body piston at the top, said oil chamber is provided between said valve body piston and said inner steel tube, said piston rod is hollow inside, said piston rod is provided with a control rod inside. The air cavity between the inner steel tube and the outer steel tube is divided into two air cavities by a guide sleeve, the control rod has a ring-shaped projection on the top edge of the side near the inner steel tube, the piston rod has an inner hollow end on the side near the inner steel tube with a diameter larger than the diameter of this ring-shaped projection, and the diameter of the remaining hollow part is smaller than the diameter of the ring-shaped projection, so that the control rod can only be displaced in the piston rod for this end distance.

Preferably, said end of said piston rod connected to said valve body piston is provided with a first seal, said end of said piston rod connected to said valve body piston is connected to one end of a valve needle, said other end of said valve needle extends into said oil cavity, and said end of said valve needle near said oil cavity is provided with a flow stopper corresponding to said valve body piston. The flow stopper on the valve needle will separate the valve cavity from the oil cavity, and when the valve needle moves, it will drive the flow stopper to move, thus opening the valve cavity and the oil cavity.

Preferably, said valve needle is provided with a valve cavity between said valve needle and said valve body piston, said valve body piston is provided with an upper cavity between said valve body piston and said inner steel pipe, and said valve body piston is provided with an overflow hole. The overflow hole in the valve body piston can open the valve cavity to the upper cavity, so that the gas or liquid in the valve cavity flows into the upper cavity.

Preferably, there is a second seal between said valve needle and said valve body piston, a third seal between said valve body piston and said inner steel tube, a fourth seal between said floating piston and said inner steel tube, and a fifth seal between said floating piston and said outer steel tube. These seals prevent the flow of gas or liquid between the parts from the position where the seals are provided, and also reduce the friction between the parts and improve the service life.

Preferably, said outer steel tube is provided with a guide sleeve at the top end near said piston rod, said guide sleeve is connected to an oil seal, said oil seal is connected to a spacer, said outer steel plate is provided with an inwardly projecting restriction ring, said spacer is fixedly connected to said outer steel tube by said restriction ring. The spacer is fixedly connected to the outer steel plate so that the guide sleeve and the oil sleeve located between the spacer and the outer steel plate are also fixed.

As a preference, said inner steel tube is welded with a first rear head at one end away from said piston rod, said inner steel tube is fixedly connected to a guide sleeve at one end away from said piston rod, said guide sleeve is provided with a guide channel, said outer steel tube is provided with a second rear head at one side away from said piston rod. The guide sleeve is used to guide the movement of the inner steel tube, the first rear head and the piston rod are welded by convex welding technology, which can avoid the appearance of pinhole and air hole, the material of this guide sleeve is nylon, the use of the guide sleeve can improve the product life.

The substantial effect of the utility model is that: the utility model reduces the collision force between the valve body piston and the spacer by means of a spring set on the piston rod, thus reducing the decibel of the sound generated by the collision; the floating piston is fixedly connected to the top of the inner steel pipe, so that the floating piston seals with the outer steel pipe when the valve needle is closed to achieve the maximum cross-sectional area difference, thus realizing the maximum locking force; the air cavity is maximized by setting a smaller inner steel pipe with a floating piston inside the outer steel pipe, thus realizing a lower elasticity ratio.

Figure 1:
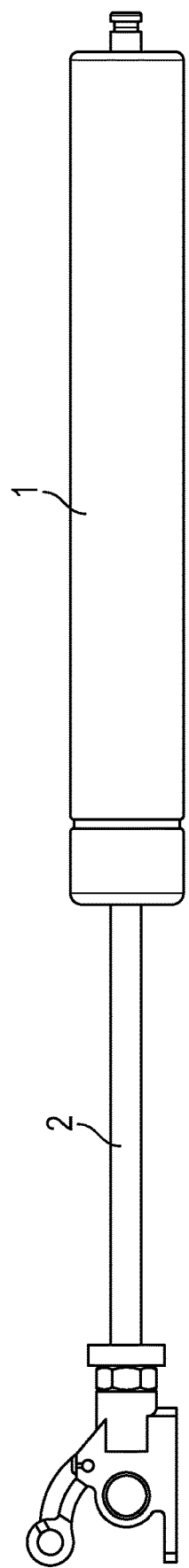
FIG. 1 shows a schematic diagram of the embodiment.

The reference numerals in the drawings designate the following components: 1, outer steel tube, 2, piston rod, 3, inner steel tube, 4, floating piston, 5, valve body piston, 6, control rod, 7, valve needle, 8, flow stopper, 9, valve chamber, 10, upper chamber, 11, first seal, 12, second seal, 13, third seal, 14, fourth seal, 15, fifth seal, 16, spacer, 17, first guide sleeve, 18, oil seal, 19, second guide sleeve, 20, inflow channel, 21, oil chamber, 22, gas chamber, 23, first rear head, 24, second rear head, 25, spring, 26, overflow hole.

DETAILED DESCRIPTION

The following specific embodiments of the utility model are further specified through specific examples, and in conjunction with the accompanying drawings.

Figure 2:
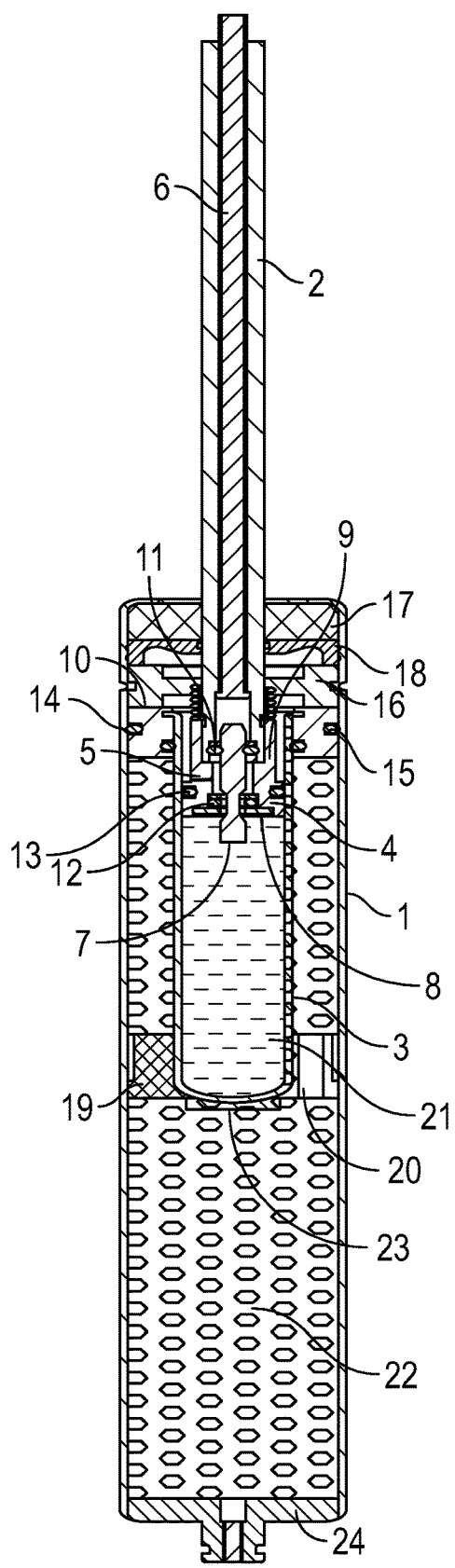
FIG. 2 shows a cross-sectional view of the embodiment.
Figure 3:
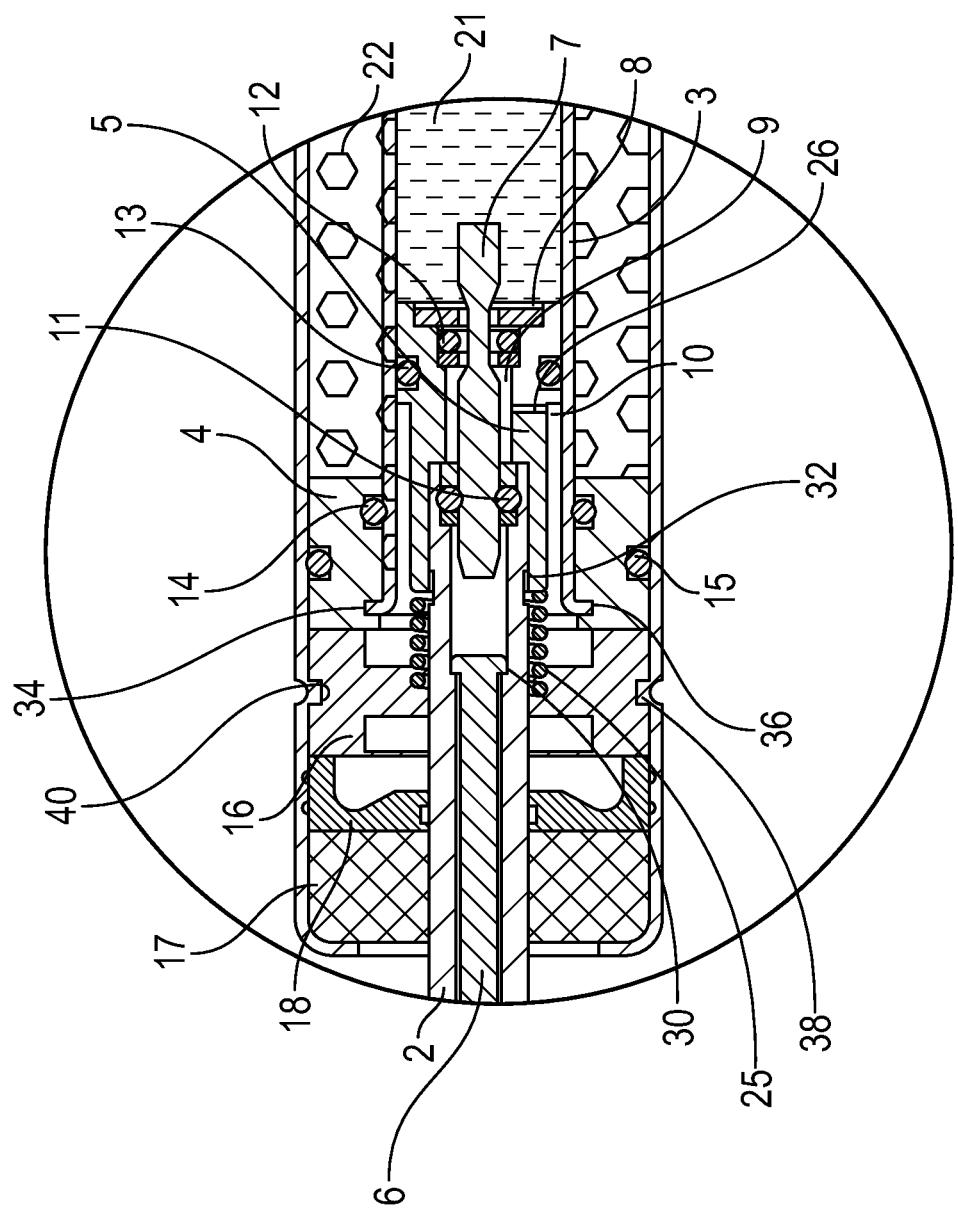
FIG. 3 shows a partially enlarged view of the embodiment.

A lockable gas spring, as shown in FIGS. 1, 2 and 3, has one end of an outer steel pipe 1 connected to one end of a piston rod 2. Piston rod 2 is hollow with a control rod 6 set inside, and the control rod has a ring-shaped projection 30 at the top edge of the side of the control rod near inner steel pipe 3, and the piston rod has an internal hollow diameter at one end near the inner steel pipe that is larger than the diameter of the ring-shaped projection, and the diameter of the remaining hollow part is smaller than the diameter of the ring-shaped projection, so the control rod can only be displaced in the piston rod for this end distance, i.e., only a small section of the control rod can extend out of the piston rod.

The top of the piston rod 2 is connected to valve body piston 5. There is a ring-shaped groove 32 at the position where the piston rod is connected to the valve body piston, and there is a ring of projection inward at the part where the valve body piston is connected to the piston rod, and the two match each other to form a dovetail structure. Valve body piston 5 is connected to piston rod 2 with a valve needle 7 in the middle position, and a part of the valve needle extends into the oil chamber 21, and the end of the valve needle near the oil chamber is provided with a flow stopper 8 corresponding to the valve body piston.

A valve cavity 9 is provided between the valve needle and the valve body piston. An upper cavity 10 is provided between the valve body piston and the inner steel pipe, and an overflow hole 26 is provided in the valve body piston so that the space between the valve body and the upper cavity can be connected.

There is a floating piston 4 connected to an end of inner steel tube 3 near the piston rod side, and there is a ring-shaped groove 34 on the inner side of the floating piston, and the shape and size of the ring-shaped groove matches the shape and size of the top part 36 of inner steel tube 3 that is bent to the outside, i.e. the size of the ring-shaped groove is slightly smaller than the thickness of the inner steel tube wall, and then the floating piston presses the inner steel tube wall into the ring-shaped groove through the ring-shaped groove and the top of the inner steel tube using the riveting process. The two are tightly connected so that the floating piston follows the movement of the inner steel tube. The end of the inner steel tube near the piston rod is welded with a steel plate for closure, so that the internal gas and liquid do not exchange with the gas in the gas chamber. The inner steel tube and the floating piston are integrated and both are floating. When the piston rod moves in and out, the inner steel tube will follow the direction of the piston rod movement due to friction.

A guide sleeve 17 is provided at the top of the outer steel tube near piston rod 2. An oil seal 18 and a spacer 16 are provided axially between guide sleeve 17 and floating piston 4. Outer steel tube 1 is provided with an inwardly projecting limit ring 38, and a groove 40 is provided on the side of spacer 16 near outer steel tube 1. Spacer 16 is riveted to limit ring 38 on outer steel tube 1 through groove 40. Spacer 16 is fixedly connected to outer steel tube 1 so that guide sleeve 17 and the oil seal 18 located between spacer 16 and outer steel tube 1 are also fixed.

There is a spring 25 on piston rod 2 between valve piston 5 and spacer 16. When the gas spring is extended to the top, the spring is compressed between spacer 16 and valve piston 5, giving a cushioning force to valve piston 5, which can slow down the extension of piston rod 2 and avoid a high decibel sound from spacer 16 and valve piston 5 forcefully colliding.

The large space between valve body piston 5 and the inner steel tube 3 is the oil chamber 21, which is filled with oil, and the space between the inner steel tube and the outer steel tube is the gas chamber 22, which is filled with gas. There is a second guide sleeve 19 fixed on the top of the side of the inner steel tube 3 away from the piston rod 2, which separates the gas chamber 22 into two parts, and there is a guide channel 20 set on the guide sleeve, and this guide channel can make the two separated spaces connected.

A first rear head 23 is welded to an end of inner steel tube 3 on the side away from piston rod 2 by means of a convex welding technique, which avoids pinholes and air holes. The outer steel tube has a second rear head 24 fixed to an end of tube 1 at a side away from piston rod 2.

There are five seals in this gas spring. First seal 11 is located on the top inside of the end where piston rod 2 is connected to valve body piston 5 and is used for sealing between valve needle 7 and piston rod 2. Second seal ring 12 is located between valve needle 7 and valve body piston 5 for sealing between valve needle 7 and valve body piston 5. Third seal 13 is located between valve body piston 5 and inner steel tube 3 for sealing between valve body piston 5 and inner steel tube 3. Fourth seal 14 is located between floating piston 4 and inner steel tube 3 for sealing between floating piston 4 and inner steel tube 3. Fifth seal 15 is located between floating piston 4 and outer steel tube 1 for sealing between floating piston 4 and outer steel tube 1. These seals prevent flow of gas or liquid between the parts from the location where the seal is provided, and also reduce the friction between the parts and increase the service life.

When external force presses control rod 6, the control rod moves, thus pushing valve needle 7 to move, so that valve needle 7 upseats from flow stopper 8, so that the upper cavity 10 and valve cavity 9 and oil chamber 21 are connected. When the external force is greater than the piston rod support force, piston rod 2 continues to press on inner tube 3, so that oil in chamber 21 is squeezed into valve chamber 9 and flows into upper chamber 10 through the overflow hole 26. At the same time, due to the reaction force of friction, piston rod 5 drives inner steel tube 3 to move in outer steel tube 1, and as the floating piston 4 follows inner steel tube 3, the gas in chamber 22 is compressed. When the external force is less than the supporting force of piston rod 2, the piston rod 2 extends outward, so that oil in upper chamber 20 is squeezed into valve chamber 9 and flows into oil chamber 21. At the same time, the gas pressure in gas chamber 22 pushes floating piston 4 outward. When the external force on the control rod is withdrawn, the external pressure and the external pressure is less than the internal pressure, thus generating a thrust to close the valve needle, and cause the flow blocker on the valve needle to seat against the valve body piston to isolate the valve cavity 9 and the lower cavity 21. At this time the oil circuit is closed, the oil is harder to be compressed, the internal pressure is unchanged, the piston rod can stay in any position, and increase the piston rod locking force for better stability.

The above examples only express several implementations of the disclosed gas spring, and their descriptions are more specific and detailed, but they should not be interpreted as a limitation of the scope of the disclosure. It should be noted that for the ordinary technical person in the field, without departing from the principles of this disclosure, several modifications and improvements can be made, which all belong to the scope of protection as defined by the claims.

The invention claimed is:

1. A gas spring, comprising:
   an outer tube having an opening at a first end and being closed at an opposite end;
   an inner tube disposed within the outer tube and attached at a first end to a floating piston, the floating piston radially sealed between the outer tube and the inner tube and axially slidable within the outer tube, a space between the outer tube and the inner tube defining a gas chamber;
   a valve piston sealingly slidable within the inner tube;
   a piston rod fixed to the valve piston and extending outwardly from the opening at the first end of the outer tube;
   a spacer fixed to the outer tube and axially disposed between the first end of the outer tube and the floating piston; and
   a spring compressible between the spacer and the floating piston.

2. The gas spring of claim 1, wherein the inner tube is bent outwardly at a first end to which the piston rod is attached, and the inner tube is riveted to the floating piston at the top.

3. The gas spring of claim 2, wherein an oil chamber is defined between the inner tube and valve piston, the piston rod is hollow, and a control rod is inside of the piston rod.

4. The gas spring of claim 3, wherein the piston rod is connected to one end of a valve needle, another end of the valve needle extends into the oil chamber, and the end of the valve needle that extends into the oil chamber is seatable on a flow stopper.

5. The gas spring of claim 4, wherein a valve cavity is located between the valve needle and valve piston, another upper cavity is located between the valve piston and the inner tube, and an overflow hole connects the valve cavity and the upper cavity.

6. The gas spring of claim 5, wherein a second seal is provided between the valve needle and the valve piston, a third seal is provided between the valve piston and the inner tube, a fourth seal is provided between the floating piston and the inner tube, and a fifth seal is provided between the floating piston and the outer tube.

7. The gas spring of claim 1, wherein a guide sleeve is connected to an oil seal axially disposed between the guide sleeve and the spacer.

8. The gas spring of claim 1, wherein the inner tube is connected to a second guide sleeve at one end away from the piston rod, and an inflow channel located on the second guide sleeve.

* * * * *